United States Patent
Naganishi et al.

(10) Patent No.: US 10,676,051 B2
(45) Date of Patent: Jun. 9, 2020

(54) CIRCUIT FOR VEHICLE

(71) Applicant: Yazaki Corporation, Tokyo (JP)

(72) Inventors: Yukinari Naganishi, Makinohara (JP); Yasuyuki Saito, Makinohara (JP); Noriaki Sasaki, Makinohara (JP); Taku Furuta, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 78 days.

(21) Appl. No.: 16/042,713

(22) Filed: Jul. 23, 2018

(65) Prior Publication Data

US 2018/0326931 A1 Nov. 15, 2018

Related U.S. Application Data

(63) Continuation of application No. PCT/JP2017/003487, filed on Jan. 31, 2017.

(30) Foreign Application Priority Data

Feb. 2, 2016 (JP) .................................. 2016-018402

(51) Int. Cl.
*B60R 16/03* (2006.01)
*B60R 16/033* (2006.01)
(Continued)

(52) U.S. Cl.
CPC ............ *B60R 16/03* (2013.01); *B60R 16/023* (2013.01); *B60R 16/0215* (2013.01);
(Continued)

(58) Field of Classification Search
CPC ... B60R 16/03; B60R 16/0215; B60R 16/023; B60R 16/033; H01R 9/031; H02G 3/16; H02G 3/00

See application file for complete search history.

(56) References Cited

U.S. PATENT DOCUMENTS 5,623,169 A 4/1997 Sugimoto et al.
5,803,371 A * 9/1998 Sugiyama ............... B05B 1/005
239/555

(Continued)

FOREIGN PATENT DOCUMENTS

EP 0 791 506 A2 8/1997
JP 5-58230 A 3/1993
(Continued)

OTHER PUBLICATIONS

International Search Report dated Apr. 25, 2017 by the International Searching Authority in International Patent Application No. PCT/JP2017/003487. (PCT/ISA/210).
(Continued)

*Primary Examiner* — Carlos Amaya
(74) *Attorney, Agent, or Firm* — Sughrue Mion, PLLC

(57) ABSTRACT

Power is supplied and a communication path secured by connecting various accessories to branch lines, each of which branches from a main line included in backbone structures. Control of power distribution and the like is implemented by communication between higher-level control units arranged in a smart power supply box, for example, and lower-level control units arranged in area drivers, for example. A switching circuit is arranged at a connection location between the main lines and the branch lines, and is automatically switched such that the terminals to be connected are coordinated. Specifications such as the current of multiple terminals on the power supply side are commonly fixed, and the power to be distributed is controlled by switching the number of terminals to be used. Component standardization and a reduction in part numbers are made easier. The connection position can be freely changed.

5 Claims, 10 Drawing Sheets

(51) Int. Cl.
  *B60R 16/02* (2006.01)
  *B60R 16/023* (2006.01)
  *H01R 9/03* (2006.01)
  *H02G 3/16* (2006.01)
  *H02G 3/00* (2006.01)

(52) U.S. Cl.
  CPC ........... *B60R 16/033* (2013.01); *H01R 9/031* (2013.01); *H02G 3/16* (2013.01); *H02G 3/00* (2013.01)

(56) References Cited

U.S. PATENT DOCUMENTS

| | | | |
|---|---|---|---|
| 6,900,555 B2* | 5/2005 | Sakamoto | H02J 1/06 307/10.1 |
| 7,546,407 B2* | 6/2009 | Sakane | B60R 16/0207 307/10.1 |
| 2002/0019165 A1 | 2/2002 | Aoki et al. | |
| 2015/0349471 A1 | 12/2015 | Maki et al. | |
| 2015/0360627 A1 | 12/2015 | Sasaki et al. | |

FOREIGN PATENT DOCUMENTS

| | | | |
|---|---|---|---|
| JP | 7-94251 A | 4/1995 |
| JP | 9-325932 A | 12/1997 |
| JP | 2001-219797 A | 8/2001 |
| JP | 2002-58151 A | 2/2002 |
| JP | 2003-175781 A | 6/2003 |
| JP | 2003-309509 A | 10/2003 |
| JP | 2005-78962 A | 3/2005 |
| JP | 2015-20579 A | 2/2015 |
| JP | 2015-227088 A | 12/2015 |
| JP | 2016-4687 A | 1/2016 |
| JP | 2016-15809 A | 1/2016 |

OTHER PUBLICATIONS

Written Opinion dated Apr. 25, 2017 by the International Searching Authority in International Patent Application No. PCT/JP2017/003487. (PCT/ISA/237).

Office Action dated Feb. 27, 2018 by the Japanese Patent Office in counterpart Japanese Patent Application No. 2016-018402.

English translation of Written Opinion dated Apr. 25, 2017 by the International Searching Authority in International Patent Application No. PCT/JP2017/003487 (PCT/ISA/237).

* cited by examiner

CIRCUIT FOR VEHICLE

CROSS REFERENCE TO RELATED APPLICATIONS

This application is a continuation of PCT application No. PCT/JP2017/003487, which was filed on Jan. 31, 2017 based on Japanese patent application No. 2016-018402 filed on Feb. 2, 2016, whose contents are incorporated herein by reference. Also, all the references cited herein are incorporated as a whole.

BACKGROUND OF THE INVENTION

1. Technical Field

The present invention relates to a circuit for a vehicle, that is routed on the vehicle.

2. Background Art

On a vehicle, power supply power has to be suitably fed, for example, from an alternator (power generator) or a battery that is a main power supply to each of a huge number of various electrical components. In addition, such a system used for feeding the power supply power also has to be provided with a function of switching ON/OFF the feed of the power in accordance with necessity or a function for cutting off a current for each electric circuit when an overcurrent flows into any electrical component.

In a general vehicle, a wire harness serving as an assembly of a large number of electric wires is routed on the vehicle so that a main power supply is connected with electrical components of respective portions through the wire harness to thereby feed power to the electrical components of the respective portions. In addition, it is general that a junction box is used for distributing the power of the power supply to a plurality of electric circuits, a relay box is used for controlling ON/OFF of the feed of the power in accordance with each of the electric circuits, or a fuse box is used for protecting each of the electric wires or a load of the wire harness.

A wire harness shown in JP-A-2015-78962 is provided with a network transmission path, and a circuit for feeding power, GND, or another signal. In addition, the wire harness is provided with a wire harness trunk line, a sub wire harness, an optional sub wire harness, and a network hub device.

SUMMARY

Recently, the structure of the aforementioned wire harness routed on a body of a vehicle tends to be complicated with an increase of the number of electrical components mounted on the vehicle. Accordingly, the wire harness trunk line, the sub wire harness, and the optional sub wire harness are combined to configure the wire harness having a complicated shape as a whole, as in JP-A-2015-78962. Thus, the wire harness can be connected with various electrical components disposed at various places on the vehicle body.

In addition, with the increase of the number of the electrical components mounted on the vehicle, the diameter of each of the electric wires constituting the wire harness increases or the number of the electric wires increases. Accordingly, the size of the wire harness as a whole tends to increase, or the weight thereof tends to increase. In addition, with a variation of types of vehicles mounted with wire harnesses or an increase in the number of kinds of optional electrical components mounted on the vehicles, the number of kinds and item numbers of the wire harnesses to be manufactured increase. Therefore, it is difficult to commonize components constituting the wire harnesses to thereby result in an increase of the component cost or manufacturing cost.

The present invention has been accomplished in consideration of the aforementioned circumstances. An object of the present invention is to provide a circuit for a vehicle, in which a structure for electric connection of various electrical components with a power supply on the vehicle and with one another is simplified and whose size and weight can be reduced.

In order to attain the aforementioned object, the circuit for the vehicle according to the present invention is characterized by the following configurations (1) to (6).

(1) A circuit for a vehicle, that is routed on the vehicle, the circuit including:

a trunk line that includes a power supply line and a communication line;

branch lines each of which includes a power supply line and a communication line;

branch portions each of which has a subordinate control portion and serves for connecting a corresponding one of the branch lines to the trunk line; and a superordinate control portion that is connected to the trunk line to thereby control distribution of power to be fed to the branch lines based on communication with the subordinate control portions and to thereby control the subordinate control portions.

According to the circuit for the vehicle according to the aforementioned configuration (1), the superordinate control portion controls the subordinate control portions so that power fed from the trunk line to the branch lines can be controlled suitably. Accordingly, even when various kinds of electrical components varying in power consumption are connected to the trunk line through the branch lines, the trunk line having a common configuration can be used so that commonization of the component and simplification of the configuration can be attained. In addition, the communication lines are also connected. Accordingly, the superordinate control portion can also control accessories connected to the subordinate control portions through the subordinate control portions.

(2) A circuit for a vehicle according to the aforementioned configuration (1), wherein:

each of the branch portions allows a plurality of the branch lines to be attached thereto or detached therefrom; and each of the subordinate control portions has a changeover circuit that changes over connection of the trunk line with the communication line and the power supply line of the branch line connected to the subordinate control portion in accordance with an accessory connected to the branch line and power to be fed to the accessory.

According to the circuit for the vehicle according to the aforementioned configuration (2), power to be fed to the branch line or connection of the communication line can be changed over in accordance with the accessory (electrical component) connected to the branch portion. Accordingly, the kinds of branch lines and accessories which can be connected can be increased.

(3) A circuit for a vehicle according to the aforementioned configuration (2), wherein:

the subordinate control portion transmits, to the superordinate control portion, information about the power to be fed to the accessory connected to the branch line connected to the subordinate control portion.

According to the circuit for the vehicle according to the aforementioned configuration (3), based on the information transmitted from the subordinate control portion, the superordinate control portion can suitably control the power to be fed to a region specified by the information.

(4) A circuit for a vehicle according to any of the aforementioned configurations (1) to (3), wherein:

each of the branch portions has an auxiliary power supply that can feed power to the branch lines connected to the branch portion.

According to the circuit for the vehicle according to the aforementioned configuration (4), even when each accessory per se connected to the branch portion is not provided with an auxiliary power supply, power can be fed from the auxiliary power supply of the branch portion to the accessory if feed of power from a main power supply of the vehicle is cut off. Accordingly, the total number of auxiliary power supplies mounted on the vehicle can be reduced so that the weight of the vehicle as a whole can be reduced.

(5) A circuit for a vehicle according to the aforementioned configuration (2), wherein:

the changeover circuit includes a first switch element that connects a terminal to a predetermined power supply line, a second switch element that connects the terminal to a ground line, a signal input/output element that allows an input or an output of a signal to the terminal, and a programmable control device that changes over a state among the first switch element, the second switch element and the signal input/output element.

According to the circuit for the vehicle according to the aforementioned configuration (5), when the trunk line or the branch line has a ground line, it is possible to selectively change over among a state in which one terminal is connected to a predetermined power supply line, a state in which the terminal is connected to the ground line, and a state in which the terminal is connected to a signal line such as the communication line. Accordingly, even when the branch line is connected to a terminal at any region on the trunk line, control can be made so that the power supply line, the ground line, the communication line, etc. can retain a matching relation between the trunk line and the branch line. Therefore, a connection region of each terminal can be selected desirably in accordance with necessity.

(6) A circuit for a vehicle according to the aforementioned configuration (2), wherein:

the subordinate control portion changes the number of connection terminals of the power supply line of the trunk line side connected to at least one power supply terminal of the branch line in accordance with the power to be fed to the accessory connected to the branch line.

According to the circuit for the vehicle according to the aforementioned configuration (6), the number of the connection terminals of the power supply line of the trunk line side connected to the power supply terminal of the branch line can be changed. Accordingly, even when power capacity allowed for each of the connection terminals of the trunk line side is fixed, the number of the connection terminals to be used can be reduced/increased to change over a connection state so that power required by the accessory controlled under the branch line can be fed. When the power capacity allowed for each of the connection terminals of the trunk line side is fixed to a specific value, commonization of the configuration of the trunk line or simplification of the configuration can be easy.

According to the circuit for the vehicle according to the present invention, a structure for electric connection of various electrical components with a power supply on the vehicle and with one another can be simplified and both the size and the weight can be reduced.

The present invention has been described above briefly. When an undermentioned mode (hereinafter referred to as "embodiment") for carrying out the invention is further read through with reference to the accompanying drawings, details of the present invention can be made clearer.

DETAILED DESCRIPTION OF EMBODIMENTS

A specific embodiment about the present invention will be described below with reference to the respective drawings.

First, a configuration example of a main portion of a system will be described.

Figure 1:
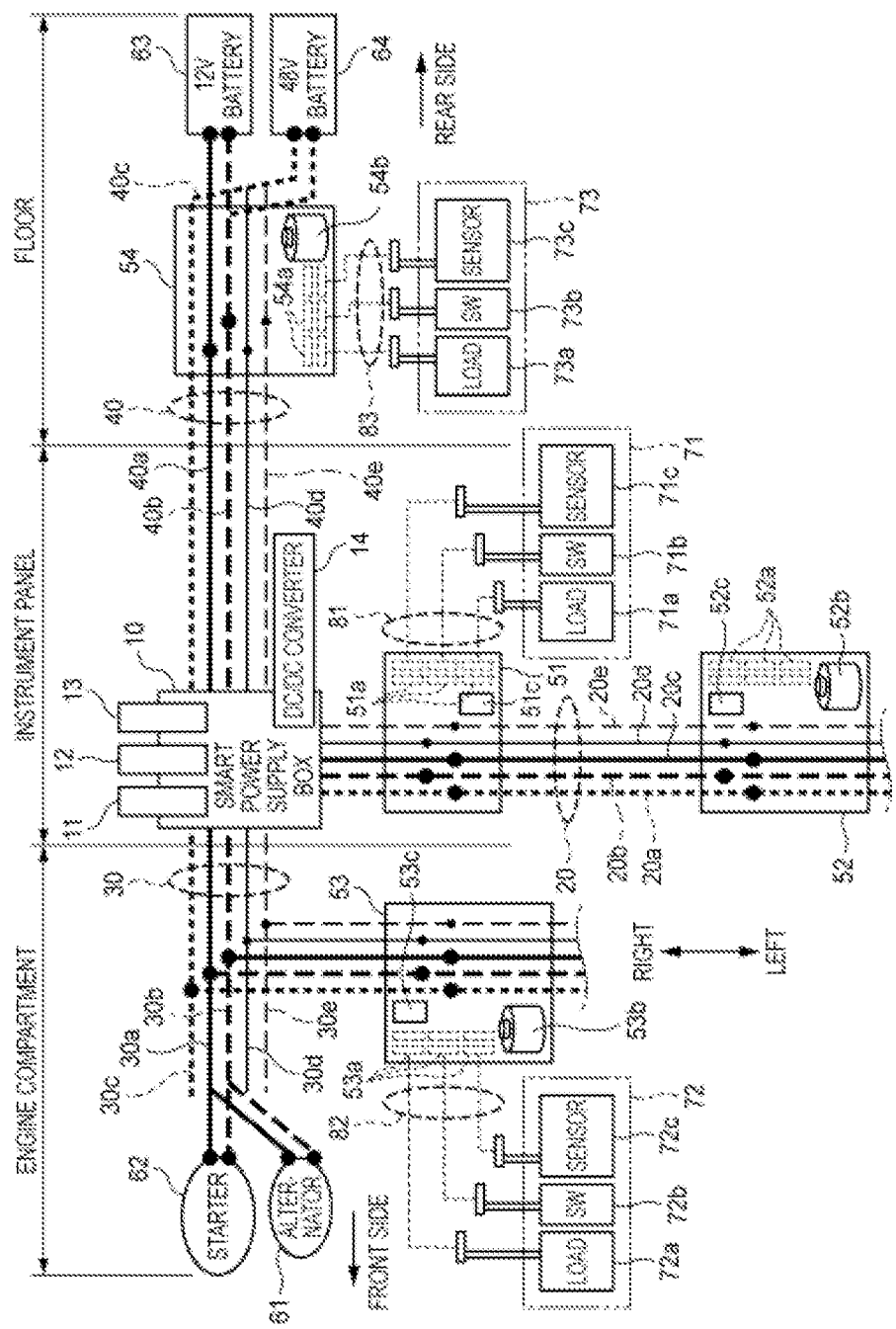
FIG. 1 is a block diagram showing a configuration example of a main portion of a system including a circuit for a vehicle in an embodiment of the invention.

The configuration example of the main portion of the system including a circuit for a vehicle in the embodiment of the present invention is shown in FIG. 1. Incidentally, the circuit for the vehicle according to the present invention is designed to realize a function equivalent to a portion or the whole of a general wire harness that can be mounted on the vehicle. However, the circuit for the vehicle according to the present invention is largely different in shape or structure from the general wire harness. Specifically, backbone structure bodies each of which is simple in shape are used for routing in order to simplify the structure. Configuration is made so that branch lines can be connected to trunk lines of the backbone structure bodies, and various accessories (electrical components) can be connected to the trunk lines of the backbone structure bodies through the branch lines.

The circuit for the vehicle included in the system shown in FIG. 1 is provided with a smart power supply box 10, a first backbone structure body 20, a second backbone structure body 30, and a third backbone structure body 40, as basic constituent elements. The first backbone structure body 20 is routed in an instrument panel portion. The second backbone structure body 30 is routed in an engine compartment portion. The third backbone structure body 40 is routed in a floor portion.

Next, the first backbone structure body 20 routed in the instrument panel portion will be described.

The first backbone structure body 20 is a structure body that is routed in a left/right direction so as to extend along the instrument panel of the vehicle. The first backbone structure body 20 is provided with a plurality of routing electrically conductive members 20a, 20b, 20c, 20d, and 20e. Each of the routing electrically conductive members 20a, 20b, 20c, 20d, and 20e is a component such as an electric wire or a busbar made of a metal material with excellent electric conductivity. The routing electrically conductive members 20a, 20b, 20c, 20d, and 20e are unified as the structure body.

In the example shown in FIG. 1, the routing electrically conductive member 20a is a power supply line for passing DC power supply power of +5[V] therethrough, the routing electrically conductive member 20b is a power supply line for passing DC power supply power of +12[V] therethrough, the routing electrically conductive member 20c is a ground line for making connection with the ground (i.e. the earth), and the routing electrically conductive members 20d and 20e are signal lines used for transmitting digital signals for communication or various analog signals. Incidentally, the ground line of each of the backbone structure bodies may be partially omitted. For example, assume that a body of the vehicle is made of metal. In this case, a vehicle body earth can be used as a part of a ground line when the ground line is connected with a nearby part of the vehicle body.

Next, the second backbone structure body 30 routed in the engine compartment portion will be described.

The second backbone structure body 30 is a structure body that is routed in the engine compartment i.e. an engine room of the vehicle. The second backbone structure body 30 is provided with a plurality of routing electrically conductive members 30a, 30b, 30c, 30d, and 30e. Each of the routing electrically conductive members 30a, 30b, 30c, 30d, and 30e is a component such as an electric wire or a busbar made of a metal material with excellent electric conductivity. The routing electrically conductive members 30a, 30b, 30c, 30d, and 30e are unified as the structure body.

Practically, it is necessary to make a large current flow into power supply lines and a ground line. Accordingly, the routing electrically conductive members 30a, 30b and 30c are constituted by the busbars each of which has a sufficiently large sectional area. In addition, when flat plate-like busbars are used as the routing electrically conductive members 30a, 30b and 30c, each of the busbars is bent easily in its thickness direction so that it is easy to process the busbar into a shape following a predetermined routing path. In addition, two communication lines are constituted by twisted pair cables in each of which two electric wires are twisted. Thus, the influence of external noise in the two communication lines can be reduced.

In the example shown in FIG. 1, the routing electrically conductive member 30a is a power supply line for passing DC power supply power of +12[V] therethrough, the routing electrically conductive member 30b is a ground line for making connection with the ground, the routing electrically conductive member 30c is a power supply line for passing DC power supply power of +48[V] therethrough, and the routing electrically conductive members 30d and 30e are the communication lines. End portions of the routing electrically conductive members 30a and 30b of the second backbone structure body 30 are connected to an alternator (power generator) 61 and a starter 62, as shown in FIG. 1.

Next, the third backbone structure body 40 routed in the floor portion will be described.

The third backbone structure body 40 is a structure body that is routed to extend in a front/rear direction along the floor portion inside the cabin of the vehicle and up to a rear side. The third backbone structure body 40 is provided with a plurality of routing electrically conductive members 40a, 40b, 40c, 40d and 40e. Each of the routing electrically conductive members 40a, 40b, 40c, 40d and 40e is a component such as an electric wire or a busbar made of a metal material with excellent electric conductivity. The routing electrically conductive members 40a, 40b, 40c, 40d and 40e are unified as the structure body.

In addition, it is necessary to make a large current flow into power supply lines and a ground line. Accordingly, the routing electrically conductive members 40a, 40b and 40c are constituted by the busbars each of which has a sufficiently large sectional area. In addition, when flat plate-like busbars are used as the routing electrically conductive members 40a, 40b and 40c, each of the busbars is bent easily in its thickness direction so that it is easy to machine the busbar into a shape following a predetermined routing path. In addition, two communication lines are constituted by twisted pair cables in each of which two electric wires are twisted. Thus, the influence of external noise in the two communication lines can be reduced.

In the example shown in FIG. 1, the routing electrically conductive member 40a is a power supply line for passing DC power supply power of +12[V] therethrough, the routing electrically conductive member 40b is a ground line for making connection with the ground, the routing electrically conductive member 40c is a power supply line for passing DC power supply power of +48[V] therethrough, and the routing electrically conductive members 40d and 40e are the communication lines.

In the third backbone structure body 40, an end portion of the routing electrically conductive member 40a is connected to a positive electrode of a first battery 63, an end portion of the routing electrically conductive member 40b is connected to a negative electrode of the first battery 63 and a negative electrode of a second battery 64, and an end portion of the routing electrically conductive member 40c is connected to a positive electrode of the second battery 64.

The first battery 63 and the second battery 64 are disposed at places, for example, under a trunk in a rear portion of the vehicle. The first battery 63 is a storage battery in which the DC power of +12[V] can be charged and discharged. The second battery 64 is a storage battery in which the DC power of +48[V] can be charged and discharged.

Next, the smart power supply box 10 will be described.

As shown in FIG. 1, the smart power supply box 10 is connected with the first backbone structure body 20, the second backbone structure body 30 and the third backbone structure body 40 so that the smart power supply box 10 can control the system as a whole.

The routing electrically conductive members 30a, 30b, 30c, 30d and 30e of the second backbone structure body 30 are connected inside the smart power supply box 10 so that the routing electrically conductive members 30a, 30b, 30c, 30d and 30e of the second backbone structure body 30 are connected with the routing electrically conductive members 40*a*, 40*b*, 40*c*, 40*d* and 40*e* of the third backbone structure body 40 respectively.

In addition, a DC/DC converter 14 provided inside the smart power supply box 10 can generate DC power of +5[V] and DC power of +12[V] based on the power of +12[V] supplied through the routing electrically conductive member 40*a* or the power of +48[V] supplied through the routing electrically conductive member 40*c*, so as to supply the DC power of +5[V] and the DC power of +12[V] to the first backbone structure body 20.

A plurality of electronic control units (ECU) 11, 12 and 13 that can be attached/detached to/from the smart power supply box 10 individually and separately are provided in the smart power supply box 10. For example, one or each of the electronic control units mounted into the smart power supply box 10 can be replaced with another in accordance with the vehicle type of the vehicle so that a function or functions can be added or changed.

Due to the functions of these electronic control units, the smart power supply box 10 can carry out various controls. For example, the smart power supply box 10 automatically identifies what is connected to each of positions placed under the first backbone structure body 20, the second backbone structure body 30 and the third backbone structure body 40, and carries out adequate control. This control includes changeover of a circuit in response to a difference in connection position, changeover of supplied power, control of an overcurrent, power backup control during occurrence of abnormality, control of a communication gateway etc. In addition, the smart power supply box 10 is also provided with a short-range wireless communication function for making wireless communication among devices on the vehicle.

Next, area drivers and accessories will be described.

In the system shown in FIG. 1, area drivers 51, 52, etc. are connected to the first backbone structure body 20 so that various accessories (electrical components) can be easily connected under the first backbone structure body 20. In addition, an area driver 53 is connected to the second backbone structure body 30, and an area driver 54 is connected to the third backbone structure body 40.

For example, the area driver 51 is provided with downstream-side connection portions 51*a* and a slave control portion 51*c*. For example, the downstream-side connection portions 51*a* are formed as a plurality of connectors in conformity with a USB (Universal Serial Bus) standard. Each of the downstream-side connection portions 51*a* is provided with a serial communication function and a power supply function.

In the example shown in FIG. 1, an accessory 71 including a load 71*a*, a switch 71*b*, and a sensor 71*c* is connected to the downstream-side connection portions 51*a* of the area driver 51 through a sub harness 81. It is also considered that sub harnesses 81 may be prepared separately and respectively for the lead 71*a*, the switch 71*b* and the sensor 71*c* or one sub harness 81 may be prepared collectively for the lead 71*a*, the switch 71*b* and the sensor 71*c*.

The slave control portion 51*c* has a function of receiving an instruction from a superordinate electronic control unit (ECU) via the smart power supply box 10 and the first backbone structure body 20 to thereby control the load 71*a* or transmit information indicating a state of the switch 71*b* or information indicating a detection state of the sensor 71*c* to the superordinate electronic control unit in accordance with the contents of the received instruction. In addition, the slave control portion 51*c* is also provided with a function of transmitting, to the smart power supply box 10, information about power supply power required by the accessory 71.

In the example shown in FIG. 1, the area driver 52 has a built-in backup battery 52*b*. When some failure occurs at one of power feeding paths in the system to thereby lead to suspension of power feeding at one place, the backup battery 52*b* is provided in order to feed backup power supply power to the place. A slave control portion 52*c* in the area driver 52 is provided with a short-range wireless communication function. Upon detection of occurrence of abnormality based on information sent by short-range wireless communication from the electronic control unit in the smart power supply box 10, the slave control portion 52*c* outputs power supply power of the backup battery 52*b* to a power supply system of the first backbone structure body 20.

Accordingly, when, for example, disconnection occurred on the first backbone structure body 20 to thereby suspend the feed of power to the area driver 51, power of the backup battery 52*b* can be fed to the accessory 71 controlled under the area driver 51. Since short-range wireless communication is used in this case, backup power can be fed even when the communication lines on the first backbone structure body 20 have been cut off.

Since the built-in backup battery 52*b* is provided on the area driver 52, reliability during occurrence of abnormality can be secured even when no backup power supply is equipped separately for each accessory. Since the backup power supply is placed on the area driver 52 side, the total number of backup power supplies can be reduced as the whole system so as contribute to reduction in size and weight.

In the example shown in FIG. 1, a backup battery 53*b* is also provided inside the area driver 53 connected to the second backbone structure body 30, and a backup battery 54*b* is provided inside the area driver 54 connected to the third backbone structure body 40. Accordingly, one can be selected from the backup batteries 52*b*, 53*b* and 54*b*, or the backup batteries 52*b*, 53*b* and 54*b* can be used in combination in accordance with a place where disconnection etc. occurred, so that suitable backup power can be fed to the necessary place on the system.

In the example shown in FIG. 1, an accessory 72 including a load 72*a*, a switch 72*b* and a sensor 72*c* is connected to downstream-side connection portions 53*a* of the area driver 53 through a sub harness 82. A slave control portion 53*c* inside the area driver 53 has a function of receiving an instruction from a superordinate electronic control unit (ECU) via the smart power supply box 10 and the second backup structure body 30 to thereby control the load 72*a* or transmit information indicating a state of the switch 72*b* or information indicating a detection statue of the sensor 72*c* to the superordinate electronic control unit in accordance with the contents of the received instruction. In addition, the slave control portion 53*c* is also provided with a function of transmitting, to the smart power supply box 10, information about power supply power required by the accessory 72.

In a similar manner to or the same manner as the above description, an accessory 73 including a load 73*a*, a switch 73*b* and a sensor 73*c* is connected to downstream-side connection portions 54*a* of the area driver 54 through a sub harness 83. A slave control portion inside the area driver 54 has a function of receiving an instruction from a superordinate electronic control unit (ECU) via the smart power supply box 10 and the third backbone structure body 40 to thereby control the load 73*a* or transmit information indicating a state of the switch 73*b* or information indicating a detection state of the sensor 73 to the superordinate electronic control unit in accordance with the contents of the received instruction. In addition, the slave control portion is also provided with a function of transmitting, to the smart power supply box 10, information about power supply power required by the accessory 73.

Next, an example of a specific layout and connection state will be described.

Figure 2:
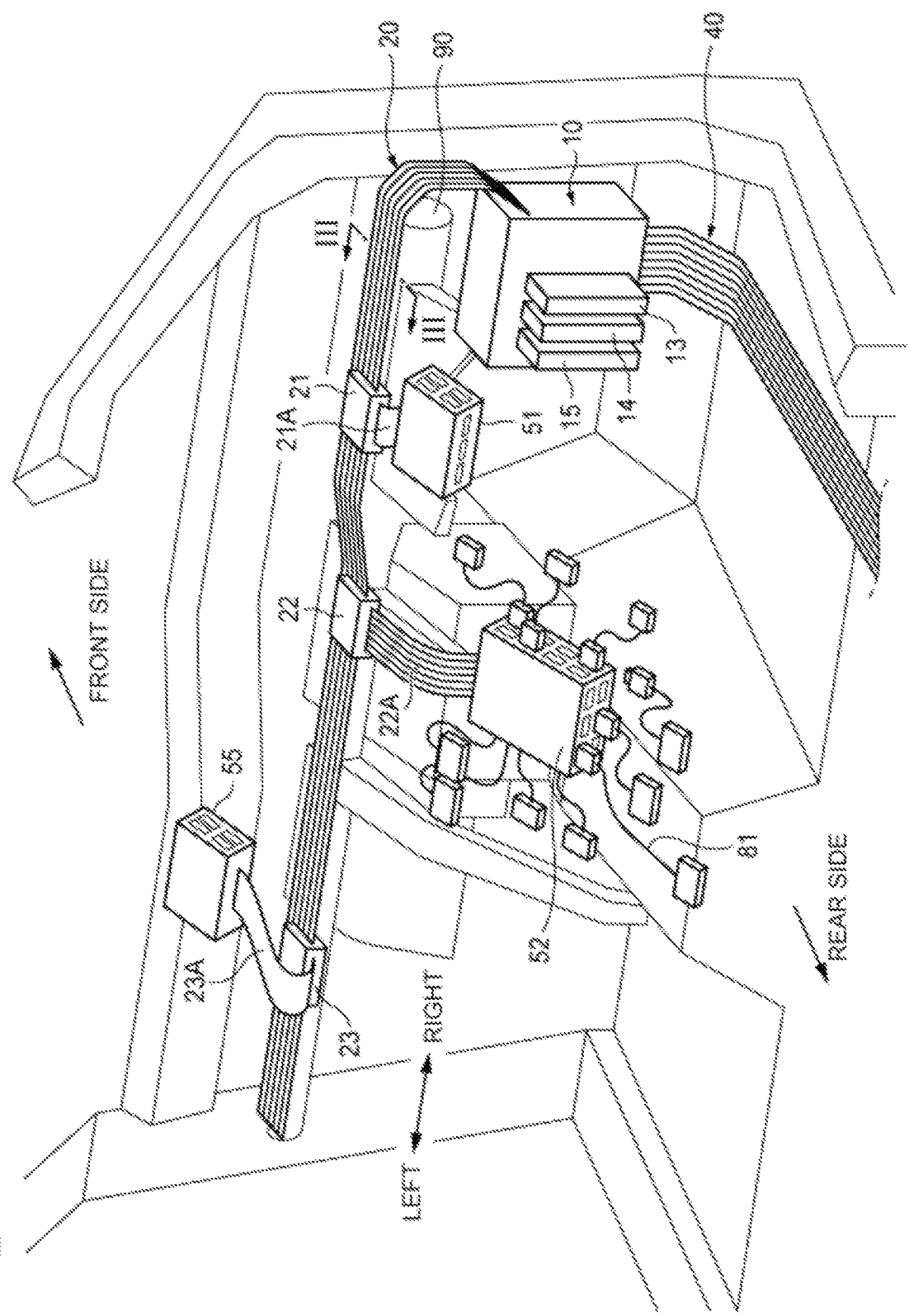
FIG. 2 is a perspective view showing a specific layout and connection state inside a cabin about a portion of the system shown in FIG. 1.

The specific layout and connection state inside the cabin about a portion of the system shown in FIG. 1 is shown in FIG. 2. In addition, a configuration example of a section seen from a line III-Ill in FIG. 2 is shown in FIG. 3A, and a modification of the same place as that in FIG. 3A is shown in FIG. 3B.

In the vehicle shown in FIG. 2, a reinforcement 90 serving as a portion of a skeleton of the vehicle body is disposed at a lower position of the instrument panel (not shown) in front of a driver's seat so as to extend in a left/right direction. The first backbone structure body 20 shown in FIG. 1 is placed to extend along the reinforcement 90 or to be formed into a structure integrated with the reinforcement 90.

Figure 3A:
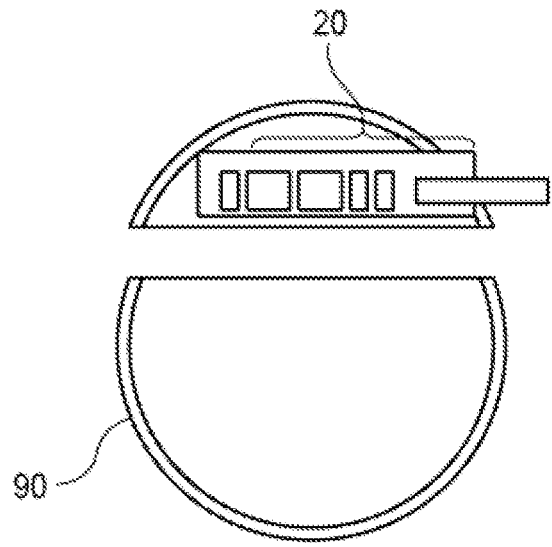
FIG. 3A is a sectional view showing a configuration example of a section seen from a line III-III in FIG. 2.
Figure 3B:
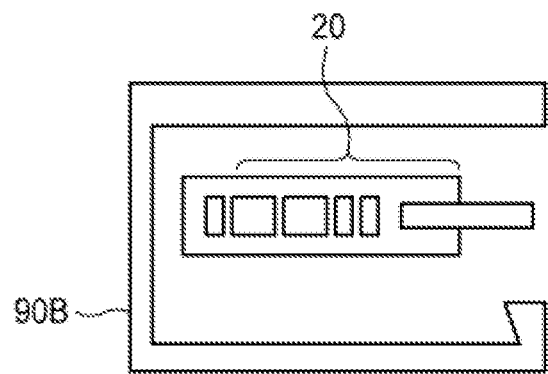
FIG. 3B is a sectional view showing a modification of the same place as that in FIG. 3A.

For example, in the configuration example shown in FIG. 3A, an upper-side portion of the reinforcement 90 shaped like a circle in section is machined to form a flat surface, and the first backbone structure body 20 shaped like a thin plate in section is fixed to extend along the flat surface. In addition, in the configuration example shown in FIG. 3B, a reinforcement 90B is formed into a hollow structure, and the first backbone structure body 20 shaped like a thin plate in section is received in an internal space of the reinforcement 90B so as to be integrated with the reinforcement 90B.

The smart power supply box 10 included in the system shown in FIG. 1 is placed on a right side in front of the driver's seat in the example shown in FIG. 2. A right end of the first backbone structure body 20 is connected to the smart power supply box 10. In addition, a front end of the third backbone structure body 40 is connected to a lower end of the smart power supply box 10.

As shown in FIG. 2, the first backbone structure body 20 and the third backbone structure body 40 are shaped like thin plates to have simple shapes. In addition, the first backbone structure body 20 and the third backbone structure body 40 are bent partially in line with shapes of places where the first backbone structure body 20 and the third backbone structure body 40 should be placed. Since the first backbone structure body 20 and the third backbone structure body 40 are shaped like the thin plates, they are comparatively easily bent in their thickness directions respectively.

In the configuration shown in FIG. 2, branch and junction boxes 21, 22 and 23 are placed at intermediate portions on the first backbone structure body 20. The first area driver 51 is connected to the first backbone structure body 20 through the branch and junction box 21. The second area driver 52 is connected to the first backbone structure body 20 through the branch and junction box 22. A third area driver 55 is connected to the first backbone structure body 20 through the branch and junction box 23.

Each of the branch and junction boxes 21, 22 and 23 has a branch line 21A, 22A, 23A for branching the routing electrically conductive members 20*a*, 20*b*, 20*c*, 20*d* and 20*e* on the first backbone structure body 20 to make connection with a corresponding one of the area drivers 51, 52 and 55.

In the configuration shown in FIG. 2, for example, a large number of sub harnesses 81 are connected to downstream-side connection portions 52*a* of the area driver 52. Accordingly, various kinds of accessories can be connected to the respective sub harnesses 81. Incidentally, the accessories may be directly connected to connectors of the downstream-side connection portions 52*a* without use of the sub harnesses 81.

Incidentally, the routing electrically conductive members 20*a* to 20*e* inside the first backbone structure body 20 may be disposed side by side in a width direction of the backbone structure body as shown in FIG. 3A, or may be laminated on one another in the thickness direction. Incidentally, in order to make the routing electrically conductive members 20*a* to 20*e* electrically insulated from one another, it is necessary to put an electrically insulating material such as a resin between adjacent ones of the routing electrically conductive members 20*a* to 20*e* or to coat each of the routing electrically conductive members 20*a* to 20*e* with the electrically insulating material such as the resin. A similar thing or the same thing is also applied to the second backbone structure body 30 and the third backbone structure body 40.

Each of the area drivers 51, 52 and 55 is provided with wired and wireless communication modules, USB standard connection ports, a semiconductor switch or a semiconductor (or its complex) having a fuse function. In addition, the backup battery 52*b* shown in FIG. 1 is mounted in at least one of the area drivers 51, 52 and 55.

Next, a connection form between a backbone structure body and each of accessories will be described in detail.

Figure 4:
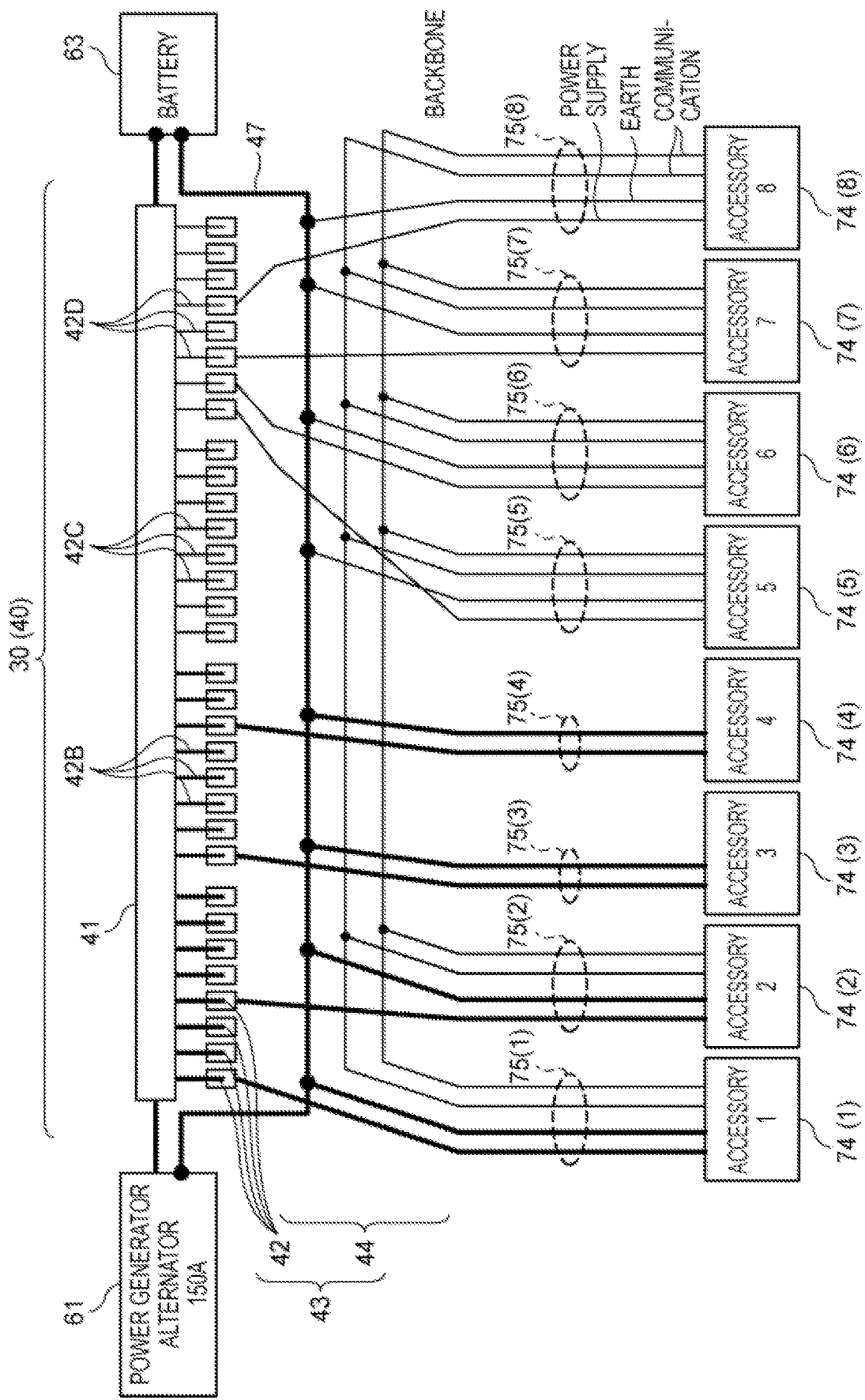
FIG. 4 is a block diagram showing a configuration example for making connection between a backbone structure body and each of accessories.
Figure 5B:
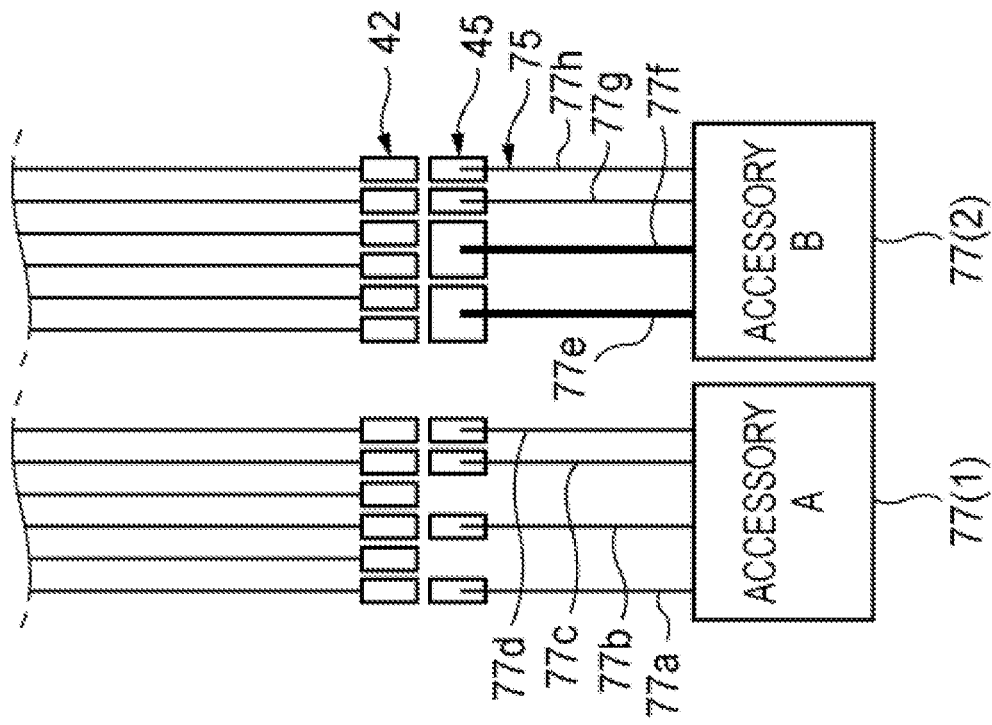
FIG. 5A and FIG. 5B are block diagrams respectively showing more specific connection examples in the configuration shown in FIG. 4.
Figure 5A:
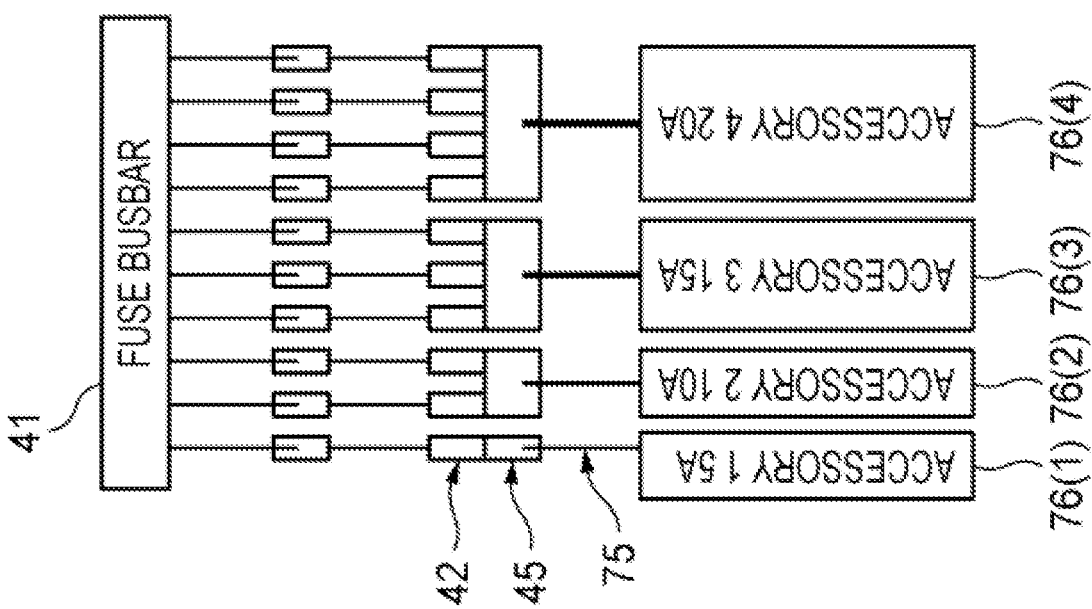

A configuration example for making connection between the backbone structure body and each of the accessories is shown in FIG. 4. In addition, more specific connection examples in the configuration shown in FIG. 4 are shown in FIG. 5A and FIG. 5B respectively.

In the system having the configuration shown in FIG. 1, various kinds of many accessories 74(1) to 74(8) are connected to respective portions of the second backbone structure body 30, the third backbone structure body 40, or the like, as shown in FIG. 4. Incidentally, description of any area driver is omitted from FIG. 4 in order to make it easy to understand.

In the configuration as in FIG. 4, a power supply feeding side connects a circuit through a fuse so as to be able to cut off a current of the circuit when an overcurrent flows therein. Here, power supply currents consumed by the accessories 74(1) to 74(8) vary from one another. Accordingly, unless fuses of suitable current values are prepared individually for the respective accessories to be connected, suitable cutting-off control cannot be performed. However, when different kinds of fuses are used for the respective accessories to be connected, configuration or specification changes according to positions to be connected. Accordingly, it is impossible to avoid complication of the configuration so that the positions to be connected have to be limited preliminarily.

Next, the configuration where a plurality of kinds of fuses are prepared will be described.

In the configuration shown in FIG. 4, a large number of terminals 42 are disposed side by side at fixed intervals on a fuse busbar 41 provided in a power supply line (the routing electrically conductive member 40*a*) of the second backbone structure body 30 or the third backbone structure body 40. A variation of displayed thickness among the terminals 42 in FIG. 4 means a variation of fuse capacity. That is, each terminal 42 indicated by a thick line can cut off a current of a large value, while each terminal 42B, 42C, 42D indicated by a thin line can cut off a current of a small value.

In the configuration shown in FIG. 4, the current to be consumed by the accessories 74(1) and 74(2) is largest. Accordingly, the accessories 74(1) and 74(2) are respectively connected to left-side ones of the terminals 42 largest in current value through wirings 75(1) and 75(2) and a connection portion 43. In addition, a current to be consumed by the accessories 74(3) and 74(4) is second largest. Accordingly, the accessories 74(3) and 74(4) are respectively connected to ones of the terminals 42B second largest in current value through wirings 75(3) and 75(4) and the connection portion 43. In addition, a current to be consumed by the accessories 74(5) to 74(8) is smallest. Accordingly, the accessories 74(5) to 74(8) are respectively connected to ones of the terminals 42D smallest in current value through wirings 75(5) to 75(8) and the connection portion 43.

Next, configurations when common fuses are used will be described.

In a configuration shown in FIG. 5A and a configuration shown in FIG. 5B, all the large number of terminals 42 connected to the fuse busbar 41 are respectively connected through fuses with a standardized fixed current value (5 [A] in this example).

In addition, a case where overcurrent values of four accessories 76(1), 76(2), 76(3) and 76(4) to be connected are 5 [A], 10 [A], 15 [A] and 20 [A] respectively is assumed in the configuration shown in FIG. 5A.

In this case, the first accessory 76(1) may be cut off by a power supply current of 5 [A]. Therefore, a power supply line of the accessory 76(1) is connected to only one of the large number of terminals 42 through a wiring 75, as shown in FIG. 5A.

On the other hand, the second accessory 76(2) is required to be cut off by a power supply current of 10 [A]. Therefore, the current is insufficient when only one terminal 42 is used. To solve this problem, a terminal 45 at a front end of a wiring 75 connected to a power supply line of the accessory 76(2) is connected in common to, of the large number of terminals 42, two terminals 42 adjacent to each other, as shown in FIG. 5A. By this connection, a fuse can be prevented from being cut off unless the current of 10 [A] flows into the power supply line of the accessory 76(2).

In a similar manner or the same manner, the third accessory 76(3) is required to be cut off by a power supply current of 15 [A]. Therefore, a terminal 45 at a front end of a wiring 75 connected to a power supply line of the accessory 76(3) is connected in common to, of the large number of terminals 42, three terminals 42 adjacent to one another, as shown in FIG. 5A. By this connection, a fuse can be prevented from being cut off unless the current of 15 [A] flows into the power supply line of the accessory 76(3).

In a similar manner or the same manner, the fourth accessory 76(4) is required to be cut off by a power supply current of 20 [A]. Therefore, a terminal 45 at a front end of a wiring 75 connected to a power supply line of the accessory 76(4) is connected in common to, of the large number of terminals 42, four terminals 42 adjacent to one another, as shown in FIG. 5A. By this connection, a fuse can be prevented from being cut off unless the current of 20 [A] flows into the power supply line of the accessory 76(4).

Incidentally, for example, the terminal 45 of the accessory 76(2) required to be cut off by the power supply current of 10 [A] may be connected in common to, of the large number of terminals 42, three or more terminals adjacent to one another. In this case, power continuity in some of the terminals can be interrupted in advance by use of a changeover circuit 44. Thus, the number of terminals that are actually electrically conductive is limited to two so that the accessory 76(2) can be cut off by the power supply current of 10 [A]. In this case, it is considered that the terminals not electrically conductive may be changed over to be used for backup etc. when failure occurs. The changeover circuit 44 will be described later.

On the other hand, in the configuration shown in FIG. 5B, one accessory 77(1) has four independent power supply lines 77a, 77b, 77c and 77d, and the other accessory 77(2) has four independent power supply lines 77e, 77f, 77g and 77h. In addition, an overcurrent value for each of the power supply lines 77a, 77b, 77c, 77d, 77g, and 77h is 5 [A], and an overcurrent value for each of the power supply lines 77e and 77f is 10 [A].

Accordingly, as shown in FIG. 5B, each of the power supply lines 77a, 77b, 77c and 77d of the accessory 77(1) is connected to one terminal 42. In addition, of the accessory 77(2), each of the power supply lines 77e and 77f is connected in common to two terminals 42, and each of the remaining power supply lines 77g and 77h is connected to one terminal 42.

Next, a specific example of a positional relation between respective terminals and connectors will be described.

Figure 6:
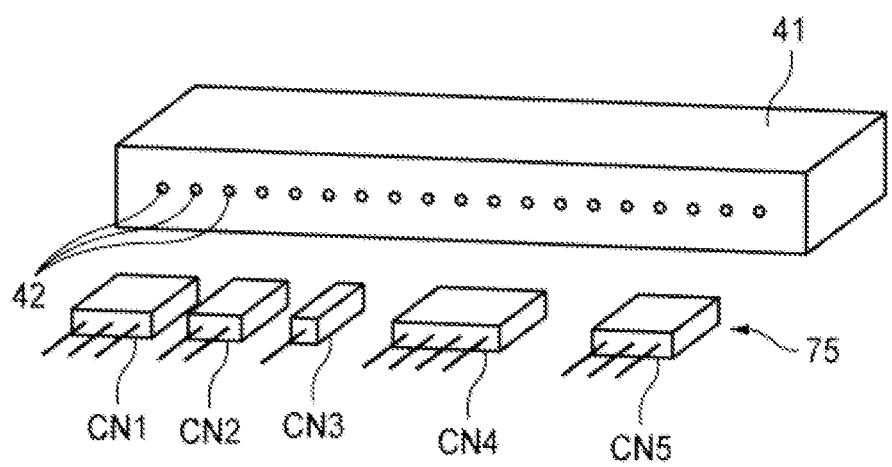
FIG. 6 is a perspective view showing an example of an arrangement state of respective terminals of a fuse busbar and a positional relationship between the terminals of the fuse busbar and connectors of wirings to be connected thereto.

An example of placement states of the respective terminals of the fuse busbar and a positional relationship between the terminals of the fuse busbar and the connectors of wirings to be connected to thereto are shown in FIG. 6.

When connection is made as in FIG. 5A or FIG. 5B, all the shape and dimensions, a current value to be cut off, and the other specifications can be commonized among the large number of terminals 42. Accordingly, for example, configurations of components such as the fuse busbar 41 can be standardized so that the common components can be used for various vehicle types. In addition, positions of the terminals to which the common components are connected can be changed desirably.

For example, even when each of terminals included in connectors CN1 to CN5 of wirings 75 shown in FIG. 6 is connected to a terminal 42 located at any position, the same operation can be performed. Accordingly, when each of the connectors CN1 to CN5 is connected to the fuse busbar 41, the connection position can be selected desirably in accordance with necessity. Therefore, the number of kinds or item numbers of the components can be reduced. In addition, when a new component is retrofitted, a position to which the new component is attached can be selected desirably. Accordingly, the attachment can be easy.

Next, a configuration example of the changeover circuit 44 will be described.

Figure 7:
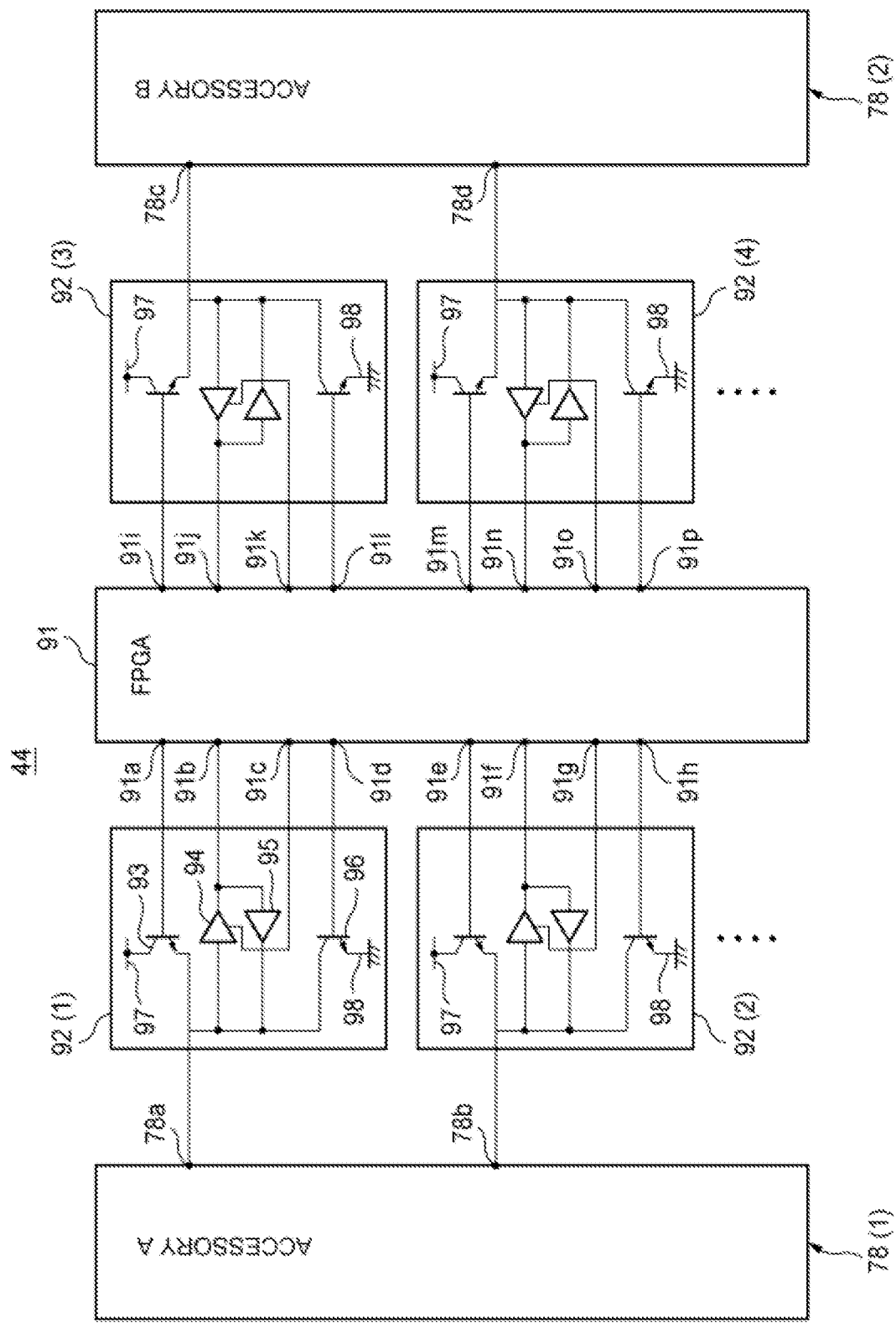
FIG. 7 is a block diagram showing a configuration example of a changeover circuit provided in the backbone structure body.

The configuration example of the changeover circuit 44 provided in a backbone structure body is shown in FIG. 7. The changeover circuit 44 is mounted in each of the first backbone structure body 20, the second backbone structure body 30 and the third backbone structure body 40. For example, the changeover circuit 44 has a function of changing over a connection state of the wiring 75 of each accessory 74 with each of the terminals 42 of the fuse busbar 41 shown in FIG. 4, a ground line 47 (corresponding to the routing electrically conductive member 20c, 30b, 40b), and a signal line (corresponding to the routing electrically conductive member 40d, 40e, or the like) such as a communication line.

The changeover circuit 44 shown in FIG. 7 has an FPGA (field-programmable gate array) module 91, and four circuit modules 92(1), 92(2), 92(3) and 92(4), as constituent members required for changing over connection states of two accessories 78(1) and 78(2).

In the example shown in FIG. 7, a case where the accessory 78(1) has two terminals 78a and 78b and the accessory 78(2) has two terminals 78c and 78d is assumed in order to make it easy to understand. The number of terminals in each of the accessories 78 may increase in accordance with necessity. When, for example, the accessory 78 has a power supply terminal, a ground terminal, and two communication line terminals, the total number of the terminals is four. When the number of the terminals of the accessory 78 increases, the number of the circuit modules 92 included in the changeover circuit 44 also increases. That is, the independent circuit modules 92 are connected to the terminals of the accessory 78 respectively.

Alternatively, when a plurality of terminals 42 of the fuse busbar 41 are connected in common to one terminal of the accessory 78 in a similar manner to or the same manner as FIG. 5A or FIG. 5B, the independent circuit modules 92 may be prepared for the terminals 42 respectively so that the circuit can be changed over separately for each of the terminals 42.

Each of the circuit modules 92(1) to 92(4) shown in FIG. 7 is provided with two switching transistors 93 and 96, and two level shift circuits 94 and 95. For example, in the transistor 93 inside the circuit module 92(1), a base terminal is connected to an output port 91a of the FPGA device 91, a collector terminal is connected to a power supply line 97, and an emitter terminal is connected to the terminal 78a of the accessory 78(1). Accordingly, as long as a signal level of the output port 91a can be controlled to thereby control ON/OFF of the transistor 93, it is possible to change over whether to connect the terminal 78a to the power supply line 97 or not.

In addition, in the transistor 96 inside the circuit module 92(1), a base terminal is connected to an output port 91d of the FPGA device 91, a collector terminal is connected to the terminal 78a of the accessory 78(1), and an emitter terminal is connected to a ground line 98. Accordingly, as long as a signal level of the output port 91d can be controlled to thereby control ON/OFF of the transistor 96, it is possible to change over whether to connect the terminal 78a to the ground line 98 or not.

In addition, in the level shift circuit 94 inside the circuit module 92(1), a signal input is connected to the terminal 78a of the accessory 78(1), an output is connected to an input/output port 91b of the FPGA device 91, and a control input terminal is connected to an output port 91c of the FPGA device 91. Accordingly, as long as a signal level of the output port 91c can be controlled to thereby change over the level shift circuit 94 to an active state, the level of a signal of the terminal 78a can be shifted to be applied to the input/output port 91b.

In addition, in the level shift circuit 95 inside the circuit module 92(1), an output is connected to the terminal 78a of the accessory 78(1), a signal input is connected to the input/output port 91b of the FPGA device 91, and a control input terminal is connected to the output port 91c of the FPGA device 91. Accordingly, as long as a signal level of the output port 91c can be controlled to thereby change over the level shift circuit 95 to an active state, the level of a signal of the input/output port 91b can be shifted to be applied to the terminal 78a.

When, for example, the terminal 78a of the accessory 78(1) serves as a power supply input terminal, the FPGA device 91 performs control to turn OFF the transistor 96, cuts off the level shift circuits 94 and 95, and perform control to turn ON the transistor 93. Thus, necessary power supply power can be fed from the power supply line 97 to the terminal 78a.

In addition, when the terminal 78a of the accessory 78(1) serves as a ground terminal, the FPGA device 91 performs control to turn OFF the transistor 93, cuts off the level shift circuits 94 and 95, and performs control to turn ON the transistor 96. Thus, the terminal 78a can be connected to the ground line 98 through the transistor 96.

In addition, when the terminal 78a of the accessory 78(1) serves as a bidirectional communication terminal, the FPGA device 91 performs control to turn OFF the transistors 93 and 96, and changes over the level shift circuits 94 and 95 to an active state. Thus, the terminal 78a can be used as a communication line to be connected to another communication line. In addition, in this case, for example, a communication line of the accessory 78(2) and the communication line of the accessory 78(1) can be also connected to each other via an internal circuit of the FPGA device 91.

That is, the FPGA device 91 controls the circuit module 92(1) suitably. Thus, even when the terminal 78a of the accessory 78(1) serves as any of the power supply input terminal, the ground terminal and the communication terminal, a required connection state can be secured.

The configuration of the circuit module 92(2) is similar to or the same as that of the circuit module 92(1). Accordingly, the FPGA device 91 changes over the state of the circuit module 92(2) suitably in a similar manner to or the same manner as the above description. Thus, even when the terminal 78b of the accessory 78(1) serves as any of a power supply input terminal, a ground terminal and a communication terminal, a required connection state can be secured.

In addition, the configuration of the circuit module 92(3) is similar to or the same as that of the circuit module 92(1). Accordingly, the FPGA device 91 changes over the state of the circuit module 92(3) suitably in a similar manner to or the same manner as the above description. Thus, even when the terminal 78c of the accessory 78(2) serves as any of a power supply input terminal, a ground terminal and a communication terminal, a required connection state can be secured. The FPGA device 91 can change over the state of the circuit module 92(4) suitably in a similar manner or the same manner. Thus, even when the terminal 78d of the accessory 78(2) serves as any of a power supply input terminal, a ground terminal and a communication terminal, a required connection state can be secured.

The internal configuration of the FPGA device 91 is programmable and can be rewritten desirably when necessary. For example, in accordance with an instruction of each of the electronic control units 11 to 13 inside the smart power supply box 10, a program of the FPGA device 91 of each changeover circuit 44 on the first backbone structure body 20, the second backbone structure body 30 or the third backbone structure body 40 can be rewritten. Thus, even when the power supply input terminal, the ground terminal, the communication terminal, etc. on the accessory side are misaligned in connection position with the terminals of the backbone structure body respectively, they can be automatically changed over into a suitable connection state.

In addition, when, for example, the terminals 78a and 78b of the accessory 78(1) shown in FIG. 7 serve as common power supply input terminals, the power supply line 97 of the circuit module 92(1) and a power supply line 97 of the circuit module 92(2) are connected to adjacent terminals 42 different from each other, power supply power can be fed to the terminals 78a and 78b of the accessory 78(1) via a plurality of paths simultaneously. That is, one terminal of the accessory side can be connected to a plurality of terminals 42 of the fuse busbar 41 side simultaneously, as shown in FIG. 5A or FIG. 5B. Even in the case where, for example, the current for each terminal 42 is fixed to 5 [A], the terminal of the accessory side can be connected to two terminals 42 simultaneously so as to allow a current of 10 [A] to flow into the terminal of the accessory side.

In addition, ON/OFF of the transistor 93 inside each circuit module 92 used for connection is controlled. Thus, of the connected terminals 42, the number of terminals used for actual electrical continuity can be also limited. Thus, power fed to each accessory from the backbone structure body can be controlled. When, for example, one power supply input terminal of one accessory is physically connected to three terminals 42 via three circuit modules 92, a current of 15 [A] can be made to flow into the power supply input terminal of the accessory. When one of the transistors 93 of the three connected circuit modules 92 is turned OFF, a current actually fed to the power supply input terminal of the accessory can be limited to 10 [A].

Next, modifications will be described.

<Modification (1)>

Figure 8:
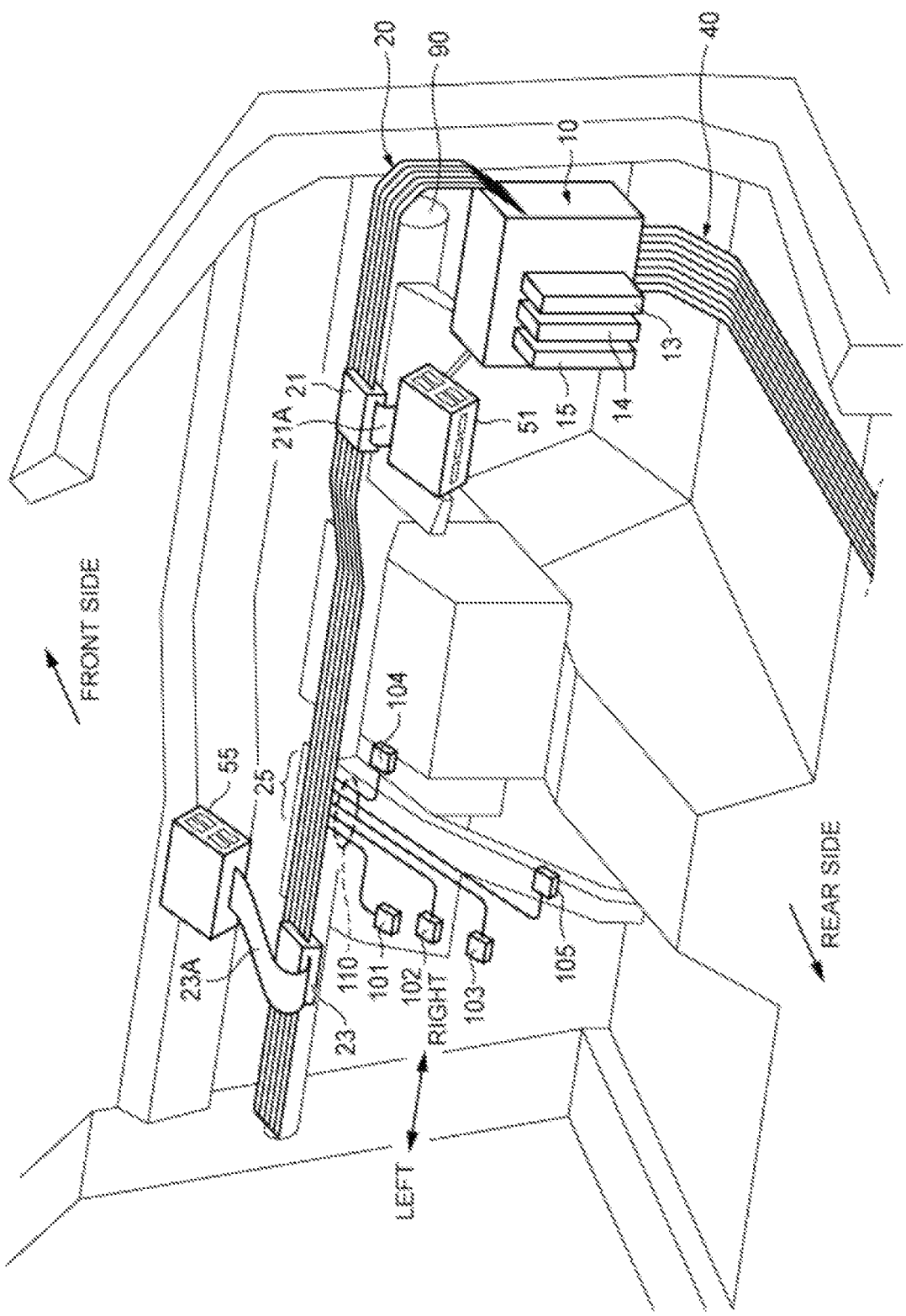
FIG. 8 is a perspective view showing a system of Modification (1) different in connection form from the configuration shown in FIG. 2.

A system of Modification (1) different in connection form from the configuration shown in FIG. 2 is shown in FIG. 8.

In the system shown in FIG. 8, each of accessories 101, 102, 103, 104 and 105 is connected not through an area driver 52 shown in FIG. 2 but directly to a connection portion 25 on a first backbone structure body 20. That is, one end of a sub harness 110 connected to the accessories 101, 102, 103, 104 and 105 is directly connected to the first backbone structure body 20 by the connection portion 25.

When, for example, a large number of signal lines that can transmit various signals are included in the first backbone structure body 20, it is unnecessary for the accessory side to perform special control of communication etc. Accordingly, not only a power supply line and a ground line inside each of the accessories 101 to 105 but also a signal line of a sensor or a switch or a control signal line can be directly connected to the first backbone structure body 20.

Alternatively, also in a case where the accessory has a control portion functioning as a subordinate control portion in a similar manner to or the same manner as the slave control portion of the area driver, the accessory can be directly connected to the first backbone structure body 20.

<Modification (2)>

Figure 9:
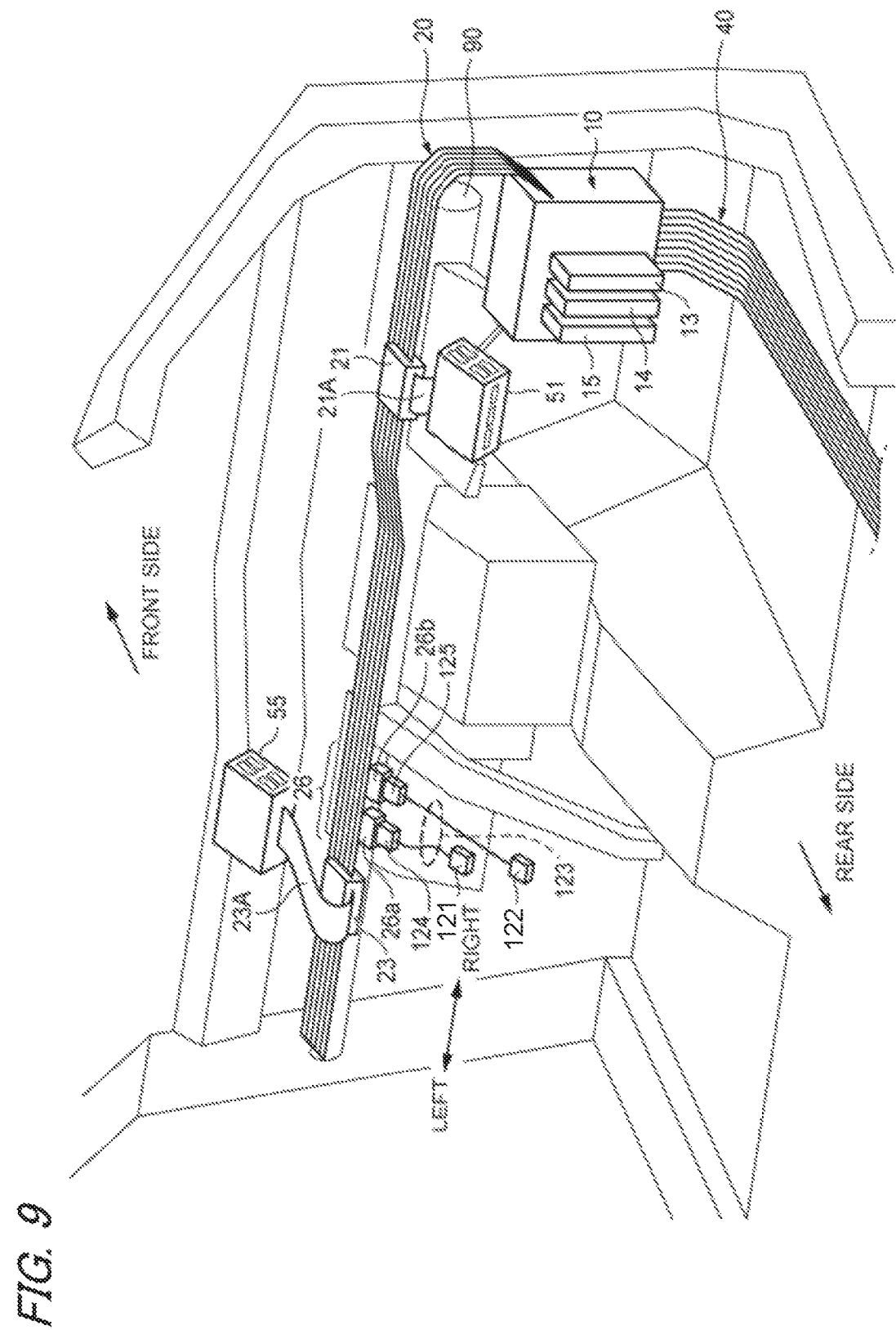
FIG. 9 is a perspective view showing a system of Modification (2) different in connection form from the configuration shown in FIG. 2.

A system of Modification (2) different in connection form from the configuration shown in FIG. 2 is shown in FIG. 9.

The system shown in FIG. 9 has a configuration in which each of accessories 121 and 122 can be connected directly to a connection portion 26 on a first backbone structure body 20 without use of an area driver 52 shown in FIG. 2.

As shown in FIG. 9, slave built-in connectors 124 and 125 are provided respectively at one ends of a sub harness 123 serving for making connection with the accessories 121 and 122. The slave built-in connectors 124 and 125 are connected to connectors 26a and 26b provided at the connection portion 26 of the first backbone structure body 20.

An electronic circuit for realizing a minimum control function required for control of each of the accessories 121 and 122 connected under a corresponding one of the slave built-in connectors 124 and 125 is incorporated into the corresponding slave built-in connector 124, 125. A communication circuit for making data communication with a superordinate electronic control unit, a driver circuit for controlling ON/OFF etc. of electrical continuity of a load in accordance with an instruction from the superordinate electronic control unit, a signal processing circuit for processing a signal of a switch or a sensor, etc. are included in the electronic circuit.

<Modification (3)>

Figure 10:
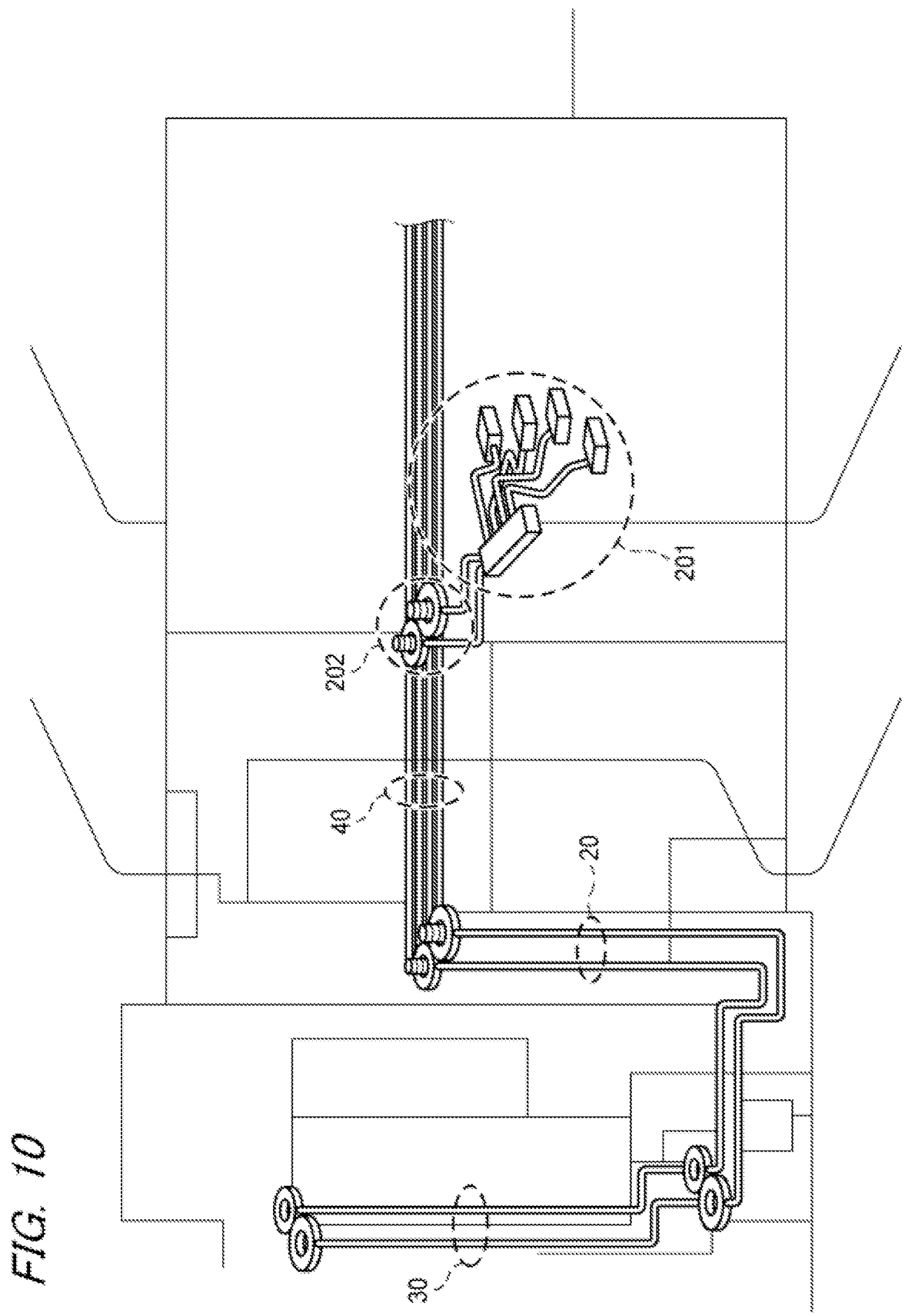
FIG. 10 is a block diagram showing a distributor that can be provided in the system shown in FIG. 1.

A distributor that can be provided in the system shown in FIG. 1 is shown in FIG. 10.

When key components such as the first backbone structure body 20, the second backbone structure body 30 and the third backbone structure body 40 of the system shown in FIG. 1 are used, the key components cannot be routed along paths of complicated shapes because the shapes of the key components are simplified. However, there is a possibility that various accessories may be present at various places in an actual vehicle. Accordingly, it is necessary to increase the degree of freedom for the routing paths.

To this end, in the system shown in FIG. 10, a distributor 201 is prepared, and wirings of the distributor 201 are coupled to the third backbone structure body 40 by a coupling portion 202. The coupling portion 202 is configured so that plate terminals of a busbar on the backbone structure body side are coupled to the wirings of the distributor 201 by stud bolts.

As shown in FIG. 10, a plurality of connection ports are provided in one distributor 201 so that a plurality of accessories or sub harnesses can be connected to the distributor 201. In addition, although one distributor 201 is connected with the third backbone structure body 40 in the example shown in FIG. 10, a plurality of distributors 201 may be connected at various places.

When structure bodies having simple shapes like the first backbone structure body 20, the second backbone structure body 30 and the third backbone structure body 40 as in the system shown in FIG. 1 are combined, the whole structure can be simplified. Thus, manufacturing can be easy, and the size and weight of each of common constituent elements can be also reduced. In addition, due to commonization of the components to be used, the number of kinds of the components can be reduced and the item numbers of the components can be also reduced. Thus, manufacturing can be easy and cost can be also reduced.

Particularly, even when power supply power to be fed varies among connected accessories, the number of terminals 42 that are configured and connected to the accessories, for example, as shown in FIG. 5A or FIG. 5B can be changed over manually or automatically to thereby conform to the variation of the power supply power. Accordingly, specifications of the terminals 42 of the fuse busbar 41 side can be commonized so that reduction of the item numbers of the components can be easy.

In addition, when various connectors CN1 to CN5 are connected to the fuse busbar 41 as shown in FIG. 6, a changeover circuit 44 is provided so that a connection position can be changed desirably. Even when connection positions of terminals are misaligned with each other respectively, the terminals can be automatically matched so that the correct terminals can be automatically connected to each other respectively.

In addition, the case where the routing electrically conductive members constituting each backbone structure body have a ground line has been described in the above description. However, when the ground can be secured by another method, such as when the ground line is manufactured and assembled separately or when a portion of the vehicle body is used as the ground as described above, each backbone structure body does not have to have the ground line. In this case, the configuration or function about the ground line can be omitted from each branch and junction box or the changeover circuit 44 belonging to the branch and junction box.

Here, the aforementioned characteristics of the embodiment of the circuit for the vehicle according to the present invention will be summarized and listed briefly in the following configurations [1] to [6] respectively.

[1] A circuit for a vehicle, that is routed on the vehicle, the circuit including:
a trunk line (routing electrically conductive members 20a to 20e, 30a to 30e, 40a to 40e) that includes a power supply line and a communication line;
branch lines (21A to 23A) each of which includes a power supply line and a communication line;
branch portions (branch and junction boxes 21 to 23) each of which has a subordinate control portion (slave control portion 51c, 52c, 53c) and serves for connecting a corresponding one of the branch lines to the trunk line; and
a superordinate control portion (electronic control unit 11 to 13) that is connected to the trunk line to thereby control distribution of power to be fed to the branch lines based on communication with the subordinate control portions and to thereby control the subordinate control portions.

[2] A circuit for a vehicle according to the aforementioned configuration [1], wherein:
each of the branch portions allows a plurality of the branch lines to be attached thereto or detached therefrom; and
each of the subordinate control portions has a changeover circuit (44) that changes over connection of the trunk line with the communication line and the power supply line of the branch line connected to the subordinate control portion in accordance with an accessory connected to the branch line and power to be fed to the accessory.

[3] A circuit for a vehicle according to the aforementioned configuration [2], wherein:
the subordinate control portion transmits, to the superordinate control portion, information about the power to be fed to the accessory connected to the branch line connected to the subordinate control portion.

[4] A circuit for a vehicle according to any of the aforementioned configurations [1] to [3], wherein:
each of the branch portions has an auxiliary power supply (backup battery 52b, 53b, 54b) that can feed power to the branch lines connected to the branch portion.

[5] A circuit for a vehicle according to the aforementioned configuration [2], wherein:
the changeover circuit (44) includes a first switch element (transistor 93) that connects a terminal to a predetermined power supply line (97), a second switch element (transistor 96) that connects the terminal to a ground line (98), a signal input/output element (level shift circuit 94, 95) that allows an input or an output of a signal to the terminal, and a programmable control device (FPGA device 91) that changes over a state among the first switch element, the second switch element and the signal input/output element.

[6] A circuit for a vehicle according to the aforementioned configuration [2], wherein:
the subordinate control portion changes the number of connection terminals (terminals 42) of the power supply line of the trunk line side connected to at least one power supply terminal of the branch line in accordance with the power to be fed to the accessory connected to the branch line.

Although the present invention has been described in detail with reference to a specific embodiment, it is obvious to those skilled in the art that various changes or modifications can be made without departing from the spirit and scope of the present invention.

What is claimed is:

1. A circuit for a vehicle, the circuit being routed in the vehicle, the circuit comprising:
a trunk line including a power supply line and a communication line;
branch lines each of which includes a power supply line and a communication line;
branch portions each of which has a first subordinate control portion and connects a corresponding one of the branch lines to the trunk line and a second superordinate control portion that is connected to the trunk line to control distribution of power to be fed to the branch lines based on communication with the first subordinate control portions and to control the first subordinate control portions,
wherein each of the branch portions allows a plurality of the branch lines to be attached thereto or detached therefrom; and
wherein each of the first subordinate control portions has a changeover circuit that changes over connection of the trunk line with the communication line and the power supply line of the corresponding branch line connected to the first subordinate control portion in accordance with an accessory connected to the corresponding branch line and power to be fed to the accessory.

2. A circuit for a vehicle according to claim 1, wherein:
a corresponding one of the first subordinate control portions transmits, to the second superordinate control portion, information about the power to be fed to the accessory connected to the corresponding branch line connected to the first subordinate control portion.

3. A circuit for a vehicle, the circuit being routed in the vehicle, the circuit comprising:
a trunk line including a power supply line and a communication line;
branch lines each of which includes a power supply line and a communication line;
branch portions each of which has a first subordinate control portion and connects a corresponding one of the branch lines to the trunk line; and
a second superordinate control portion that is connected to the trunk line to control distribution of power to be fed to the branch lines based on communication with the first subordinate control portions and to control the first subordinate control portions, wherein:
each of the branch portions has an auxiliary power supply that can feed power to the branch lines connected to the branch portion.

4. A circuit for a vehicle according to claim 1, wherein:
each changeover circuit includes a first switch element that connects a terminal to a predetermined power supply line, a second switch element that connects the terminal to a ground line, a signal input/output element that allows an input or an output of a signal to the terminal, and a programmable control device that changes over a state among the first switch element, the second switch element and the signal input/output element.

5. A circuit for a vehicle according to claim 1, wherein:
the first subordinate control portion changes the number of connection terminals of the power supply line of the trunk line connected to at least one power supply terminal of the corresponding branch line in accordance with the power to be fed to the accessory connected to the corresponding branch line.

* * * * *